United States Patent [19]

Takeda

[11] 4,173,864
[45] Nov. 13, 1979

[54] SECONDARY AIR FEED CONTROL DEVICE

[75] Inventor: Keiso Takeda, Susono, Japan

[73] Assignee: Toyota Jidosha Kogyo Kabushiki Kaisha, Toyota, Japan

[21] Appl. No.: 849,621

[22] Filed: Nov. 8, 1977

[30] Foreign Application Priority Data

Aug. 24, 1977 [JP] Japan .................. 52-100577

[51] Int. Cl.² .................................... F01N 3/10
[52] U.S. Cl. .......................... 60/276; 60/290
[58] Field of Search ............... 60/276, 289, 290

[56] References Cited

U.S. PATENT DOCUMENTS

| | | | |
|---|---|---|---|
| 3,430,437 | 3/1969 | Saussele | 60/290 |
| 4,037,407 | 7/1977 | Hartel | 60/276 |
| 4,087,964 | 5/1978 | Miyagi | 60/290 |
| 4,100,735 | 7/1978 | Miyagi | 60/290 |

Primary Examiner—Douglas Hart

Attorney, Agent, or Firm—Stevens, Davis, Miller & Mosher

[57] ABSTRACT

Disclosed is a secondary air feed control device in an internal combustion engine having in its exhaust system a three way catalytic converter and an oxygen concentration detector. This detector provides a signal indicating that the total air-fuel ratio is smaller than the stoichiometric air-fuel ratio. The secondary air feed control device comprises a valve port through which the secondary air passes, and an air valve co-operating with the valve port. The air valve is actuated by a pair of diaphragm apparatus. One of the diaphragm apparatus is selectively connected to either the intake manifold or the atmosphere via a restricted opening in response to said signal. The other diaphragm apparatus is selectively connected to either a vacuum source of a constant level or the atmosphere via a restricted opening in response to said signal. The opening speed of the air valve is reduced and the closing speed of the air valve is increased in accordance with the reduction in the level of the load of the engine.

9 Claims, 4 Drawing Figures

SECONDARY AIR FEED CONTROL DEVICE

DESCRIPTION OF THE INVENTION

The present invention relates to a secondary air feed control device in an internal combustion engine.

As a method of simultaneously reducing the amount of harmful HC, CO and $NO_x$ components in the exhaust gas, there is known a method of using a three way catalyzer. As is known to those skilled in the art, the highest purifying efficiency of the three way catalyzer can be obtained when the total air-fuel ratio becomes equal to the stoichiometric air-fuel ratio. (If the intake passage and the exhaust passage located upstream of the three way catalytic converter are defined as an air-fuel passage, the total air-fuel ratio is defined as the ratio of the amount of air fed into the air-fuel passage to the amount of fuel fed into the air-fuel passage.) Consequently, in a conventional engine equipped with the three way catalytic converter, an oxygen concentration detector capable of detecting the total air-fuel ratio is arranged in the exhaust system of the engine, and a rich air-fuel mixture is fed into the cylinder of the engine. In addition, secondary air is fed into the exhaust system so that the total air-fuel ratio becomes equal to the stoichiometric air-fuel ratio on the basis of the output signal of the oxygen concentration detector. As a typical secondary air feed control device of this type, there has been proposed a secondary air feed control device in which a secondary air feed control valve is disposed in the secondary air feed passage communicating the secondary air feed port disposed in the exhaust system with the air pump driven by the engine. The secondary air feed control valve comprises a diaphragm apparatus for opening the air valve of the secondary air feed control valve, and a diaphragm apparatus for closing the air valve, the diaphrams of both diaphragm apparatuses being connected to the common valve stem of the air valve. Each of the vacuum chambers of the diaphragm apparatus is connected to a vacuum source of a constant vacuum level via respective separate switching valves capable of connecting the vacuum chambers to the atmosphere. As a result, vacuum is alternately produced in the vacuum chambers by the switching operation of the switching valves. In this secondary air feed control valve, when the total air-fuel ratio becomes smaller than the stoichiometric air-fuel ratio, the air valve is fully opened to feed secondary air into the exhaust passage. On the other hand, when the total air-fuel ratio becomes larger than the stoichiometric air-fuel ratio, the air valve is completely closed to stop the secondary air feed operation.

As mentioned above, in a secondary air feed control device of the above-mentioned type, the vacuum chambers of the diaphragm apparatuses are connected to either the atmosphere or the vacuum source of a constant vacuum level. Consequently, when the vacuum chambers are connected to the vacuum source, vacuum of a constant level is produced in the vacuum chambers. As a result of this, the air valve is closed or opened at a constant speed independent of the operating condition of the engine, so that the amount of secondary air fed into the exhaust system is precisely controlled.

In general, the amount of air fed into the cylinder is increased as the number of revolutions per minute of the engine is increased and, therefore, it is necessary to increase the amount of secondary air fed into the exhaust system as the number of revolutions per minute of the engine is increased. Consequently, in the case wherein an air pump driven by the engine is used as a secondary air source, since the amount of secondary air delivered from the delivery side of the air pump is increased as the number of revolutions per minute of the engine is increased, it is possible to increase the amount of secondary air fed into the exhaust system in accordance with the increase in the number of revolutions per minute of the engine. FIG. 3(b) shows the change in the amount of secondary air fed into the exhaust system in the case wherein the number of revolutions per minute of the engine is changed while the vacuum level in the intake manifold is maintained at a constant level of $-200$ mm Hg. In FIG. 3, the ordinate indicates the total air-fuel ratio (A/F)t, and the abscissa S indicates the valve lift of the air valve. In addition, in FIG. 3(b), the lines c, d and e indicate the relationship between the total air-fuel ratio and the valve lift in the case wherein the engine is rotating at 1000 r.p.m, 1600 r.p.m and 2400 r.p.m, respectively. Referring to FIG. 3(b), it is understood that, when the engine is operating under a constant load, even if the number of revolutions per minute of the engine is changed, an amount of secondary air, which is proportional to the amount of air fed into the cylinder of the engine, is fed into the exhaust system. On the other hand, FIG. 3(a) shows the change in the total air-fuel ratio in the case wherein the level of the load of the engine is changed while the number of revolutions per minute of the engine is maintained at a constant value of 1600 r.p.m. In FIG. 3(a), the lines e, f and g indicate the relationship between the total air-fuel ratio (A/F)t and the valve lift S of the air valve in the case wherein the vacuum level in the intake manifold is equal to $-200$ mm Hg, $-300$ mm Hg and $-400$ mm Hg, respectively. As it will be understood from FIG. 3(a), when the level of the load of the engine is reduced, that is, when the vacuum level in the intake manifold is increased, the total air-fuel ratio is increased, that is, excessive secondary air is fed into the exhaust system of the engine. Consequently, when the engine is operating under a light load, the total air-fuel ratio becomes large. As a result of this, when the engine is operating under a light load, since the total air-fuel ratio fluctuates greatly, the purifying efficiency of the three way catalyzer is reduced. As is shown in FIG. 3(a), the ratio of the amount of secondary air fed into the exhaust system to the amount of air fed into the cylinder of the engine is increased as the level of the load of the engine is reduced. Consequently, the fluctuation of the total air-fuel ratio becomes large as the level of the load of the engine is reduced.

An object of the present invention is to provide a secondary air feed control device capable of always feeding an appropriate amount of secondary air into the exhaust system to minimize the fluctuation of the total air-fuel ratio by preventing secondary air from being excessively fed into the exhaust system when the engine is operating under a light load.

According to the present invention, there is provided a secondary air feed control device of an internal combustion engine having an intake passage and an exhaust passage equipped with a three way catalytic converter, said device comprising: means for detecting the total air-fuel ratio to provide a detecting signal indicating that the total air-fuel ratio is smaller than the stoichiometric air-fuel ratio; an air pump driven by the engine; a secondary air inlet opening into the exhaust passage located upstream of the three way catalytic converter; and valve means comprising a valve chamber connected to said air pump, a first valve port communicating said valve chamber with said secondary air inlet, a second valve port communicating said valve chamber with the atmosphere, an air valve co-operating with said first and said second valve ports, and means actuating said air valve in response to said detecting signal for reducing the opening speed of said air valve when it opens said first valve port and for increasing the closing speed of said valve when it closes said first valve port in accordance with the reduction in the level of the load of the engine.

The present invention may be more fully understood from the description of a preferred embodiment of the invention set forth below, together with the accompanying drawings.

DESCRIPTION OF A PREFERRED EMBODIMENT

Figure 1:
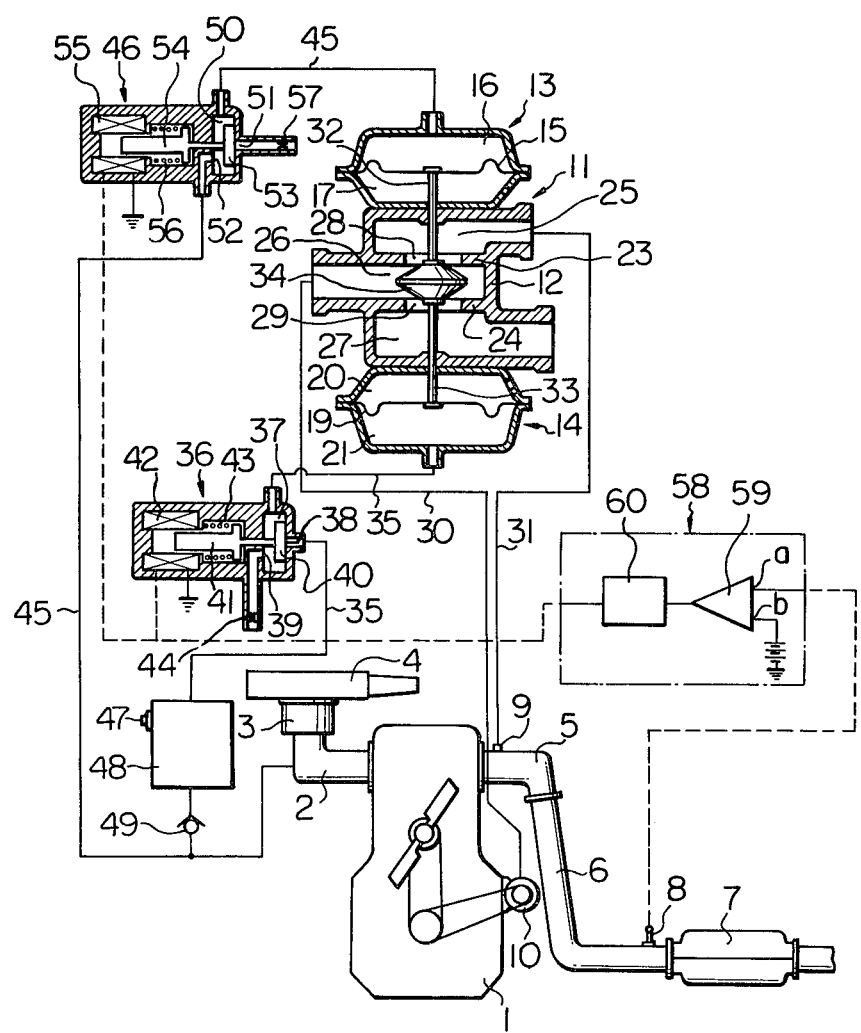
FIG. 1 is a general view of a secondary air feed control device according to the present invention.

Referring to FIG. 1, 1 designates an engine body, 2 an intake manifold, 3 a carburetor set so as to be able to always form a rich air-fuel mixture and 4 an air cleaner; 5 designates an exhaust manifold, 6 an exhaust pipe, 7 a three way catalytic converter and 8 an oxygen concentration detector disposed in the exhaust pipe 6 located upstream of the three way catalytic converter 7; 9 designates a secondary air feed port arranged in the exhaust pipe 6 located upstream of the oxygen concentration detector 8, 10 an air pump driven by the engine and 11 a secondary air feed control valve. This secondary air feed control valve 11 comprises a pair of diaphragm apparatuses 13 and 14 which are fixed onto the upper end and the lower end of a housing 12, respectively. The diaphragm apparatus 13 comprises a vacuum chamber 16 and an atmospheric pressure chamber 17 which are separated by a diaphragm 15. On the other hand, the diaphragm apparatus 14 comprises an atmospheric pressure chamber 20 and a vacuum chamber 21 which are separated by a diaphragm 19.

A pair of partitions 23 and 24 is formed in the housing 12, and the inside of the housing 12 is divided into three chambers, consisting of an upper chamber 25, a valve chamber 26 and a lower chamber 27, by means of the partitions 23 and 24. A first valve port 28 is formed on the partition 23, while a second valve port 29 is formed on the partition 24. The lower chamber 27 is always in communication with the atmosphere, and the valve chamber 26 is connected to the air pump 10 via a secondary air conduit 30. In addition, the upper chamber 25 is connected to the secondary air feed port 9 via a secondary air conduit 31. A valve head 34, connected to the diaphragms 15 and 19 via valve rods 32 and 33, respectively, is arranged in the valve chamber 26 so as to face the valve ports 28 and 29.

The vacuum chamber 16 of the diaphragm apparatus 13 is connected to the intake manifold located downstream of the throttle valve of the carburetor 3 via a vacuum conduit 45 and an electromagnetic switching valve 46. This electromagnetic switching valve 46 comprises a valve chamber 50, a pair of ports 51 and 52 opening into the valve chamber 50, a valve head 53 alternately closing the valve ports 51 and 52, a movable plunger 54 connected to the valve head 53, and a solenoid 55 attracting the movable plunger 54. The valve 53 normally closes the port 51 due to the spring force of a compression spring 56. The valve chamber 50 is connected to the vacuum chamber 16 via the vacuum conduit 45, and the port 52 is connected to the intake manifold 2 via the vacuum conduit 45. In addition, the port 51 is connected to the atmosphere via a restricted opening 57.

On the other hand, an electromagnetic valve 36, an accumulator 48 equipped with a pressure regulating valve 47 and a check valve 49 permitting the outflow of air from the accumulator 48 to the intake manifold 2 are disposed in a vacuum conduit 35 communicating the vacuum chamber 21 of the diaphragm apparatus 14 with the intake manifold 2. The inside of the accumulator 48 is always maintained at a constant vacuum level of, for example, −200 mm Hg, by means of the pressure regulating valve 47 and the check valve 49. The electromagnetic switching valve 36 comprises a valve chamber 37, a pair of ports 38 and 39 opening into the valve chamber 37, a valve head 40 alternately closing the ports 38 and 39, a movable plunger 41 connected to the valve head 40, and a solenoid 42 attracting the movable plunger 41. The valve head 40 normally closes the port 38 due to the spring force of a compression spring 43. The valve chamber 37 is connected to the vacuum chamber 21 via the vacuum conduit 35 and the port 39 is connected to the atmosphere via a restricted opening 44. In addition, the port 38 is connected to the accumulator 48 via the vacuum conduit 35. The solenoids 42 and 55 of the electromagnetic switching valves 36 and 46 are connected to an electronic control circuit 58 as shown by the broken line in FIG. 1.

As is known to those skilled in the art, the oxygen concentration detector 8 produces an output voltage of about 0.9 volt when the total air-fuel ratio is smaller than the stoichiometric air-fuel ratio, while the oxygen concentration detector 8 produces an output voltage of about 0.1 volt when the total air-fuel ratio is larger than the stoichiometric air-fuel ratio. The output voltage of the oxygen concentration detector 8 is applied to an input terminal a of a comparator 59 of the electronic control circuit 58, while a reference voltage is applied to the other terminal b of the comparator 59. The comparator 59 is turned to the ON condition when the input voltage in the input terminal a is above the reference voltage of, for example 0.5 volt, that is, when the total air-fuel ratio is smaller than the stoichiometric air-fuel ratio; while the comparator 59 is turned to the OFF condition when the input voltage in the input terminal a is below 0.5 volt, that is, when the total air-fuel ratio is larger than the stoichiometric air-fuel ratio. Consequently, when the total air-fuel ratio is smaller than the stoichiometric air-fuel ratio, that is, when the fuel is excessive, the output voltage of the comparator 59 is amplified by an amplifier 60 and, then, the output voltage thus amplified is applied to the solenoids 42 and 55. As a result of this, the solenoids 42 and 55 are energized and, thus, the valve heads 40 and 53 are moved to the left in FIG. 1 to close the ports 39 and 52, respectively. At this time, the vacuum chamber 21 of the diaphragm apparatus 14 is connected to the accumulator 48 via the vacuum conduit 35, while the vacuum chamber 16 of the diaphragm apparatus 13 is connected to the atmosphere via the restricted opening 57. As a result of this, since a vacuum of a constant level (for example, −200 mm Hg) is produced in the vacuum chamber 21, the diaphragm 19 moves downwards. At the same time, the valve head 34 moves downwards to open the valve port 28, whereby the amount of secondary air fed into the exhaust manifold 5 is gradually increased. As mentioned above, before the solenoid 55 is energized, the vacuum chamber 16 is in communication with the intake manifold 2 and, thus, the vacuum level in the vacuum chamber 16 is equal to the vacuum level in the intake manifold 2. Then, the vacuum chamber 16 is connected to the atmosphere via the restricted opening 57 when the solenoid 55 is energized. After this, the vacuum level in the vacuum chamber 16 is gradually reduced due to the presence of the restricted opening 57 and, thus, the pressure in the vacuum chamber 16 becomes equal to the atmospheric pressure after a short period of time.

Figure 2:
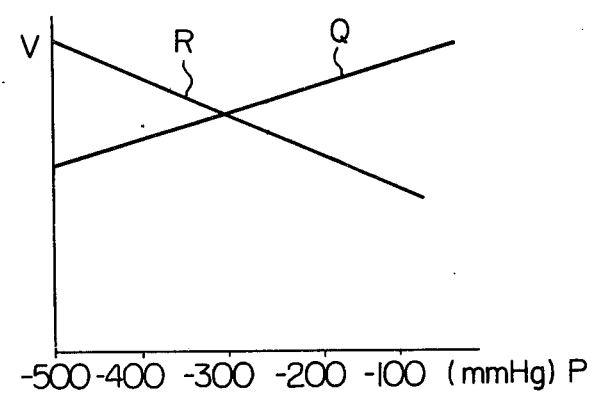
FIG. 2 is a graph showing the opening and the closing velocity of the air valve.
Figure 3A:
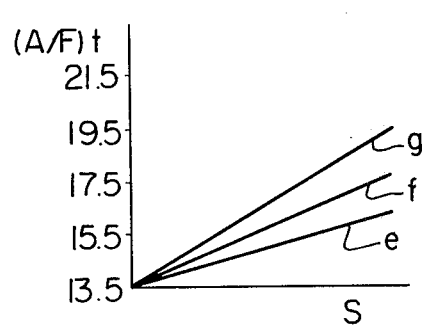
FIG. 3(a) is a graph showing the relationship between the total air-fuel ratio and the valve lift of the air valve in the case wherein the level of the load of the engine is changed while maintaining the number of revolutions per minute of the engine at a constant value, in a conventional secondary air feed control device.
Figure 3B:
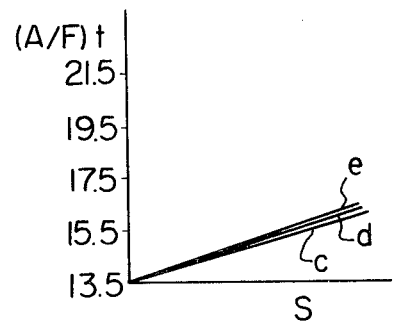
FIG. 3(b) is a graph showing the relationship between the total air-fuel ratio and the valve lift of the air valve in the case wherein the number of revolutions per minute of the engine is changed while maintaining the load of the engine at a constant level in a conventional secondary air feed control device.

The opening speed of the valve head 34 when it opens the valve port 28 is determined by the pressure difference between the vacuum in the vacuum chamber 16 and the vacuum in the vacuum chamber 21, and by the opening area of the restricted opening 57. However, in the embodiment shown in FIG. 1, the restricted opening 57 has a fixed opening area and, thus, the opening speed of the valve head 34 is determined only by the pressure difference between the vacuum in the vacuum chamber 16 and the vacuum in the vacuum chamber 21. In addition, after the electromagnetic switching valve 36 is energized, a vacuum of a constant level is produced in the vacuum chamber 21. Consequently, the opening speed of the valve head 34 is determined only by the vacuum level in the vacuum chamber 16. That is, the greater the vacuum level in the vacuum chamber 16 becomes, the lower the opening speed of the valve head 34 becomes. The vacuum level in the vacuum chamber 16 becomes approximately equal to the vacuum level in the intake manifold 2 immediately after the electromagnetic switching valve 46 is energized. On the other hand, the vacuum level in the intake manifold 2 is increased as the level of the load of the engine is reduced. Consequently, in the embodiment shown in FIG. 1, the opening speed of the valve head 34 is reduced as the level of the load of the engine is reduced. That is, since the amount of secondary air fed into the exhaust manifold 5 is reduced as the opening speed of the valve head 34 is reduced, the amount of secondary air fed into the exhaust manifold 5 is reduced as the level of the load of the engine is reduced. The opening speed of the valve head 34 is shown by the line Q in FIG. 2. In FIG. 2, the ordinate indicates the opening and closing velocity V of the valve head 34, and the abscissa indicates the vacuum level P in the intake manifold.

On the other hand, when the total air-fuel ratio becomes larger than the stoichiometric air-fuel ratio, that is, when the air fed into the cylinder becomes excessive, the solenoids 42 and 55 are de-energized, whereby the valve heads 40 and 53 are returned to the position shown in FIG. 1. At this time, the vacuum chamber 16 is connected to the intake manifold 2 via the vacuum conduit 45, while the vacuum chamber 21 is connected to the atmosphere via the restricted opening 44. Immediately after the solenoids 42 and 55 are de-energized, the vacuum level in the vacuum chamber 21 remains approximately equal to a constant level of −200 mm Hg. Consequently, in this case, the closing speed of the valve head 34 when it closes the valve port 28 is determined only by the vacuum level in the vacuum chamber 16. That is, the greater the vacuum level in the vacuum chamber 16 becomes, the faster the closing speed of the valve head 34 becomes. As mentioned above, since the vacuum chamber 16 is connected to the intake manifold 2 when the solenoid 46 is de-energized, the vacuum level in the vacuum chamber 16 becomes equal to the vacuum level in the intake manifold 2. Since the vacuum level in the intake manifold 2 is increased as the level of the load of the engine is reduced, the vacuum level in the vacuum chamber 16 is increased as the level of the load of the engine is reduced. Consequently, the closing speed of the valve head 34 is increased as the level of the load of the engine is reduced. Since the amount of the secondary air fed into the exhaust manifold 5 is reduced as the closing speed of the valve head 34 is increased, the amount of the secondary air fed into the exhaust manifold 5 is reduced as the level of the load of the engine is reduced. The closing speed of the valve head 34 is shown by the line R in FIG. 2. When the valve head 34 moves upwards, the valve head 34 opens the valve port 29 and, then, closes the valve port 28. Consequently, secondary air delivered from the air pump 10 is returned to, for example, the air cleaner 4 via the secondary air conduit 30, the valve chamber 26 and the valve port 29 and, thus, the feeding operation of secondary air is stopped.

As mentioned above, the opening speed of the valve head 34 is reduced as the level of the load of the engine is reduced, while the closing speed of the valve head 34 is increased as the level of the load of the engine is reduced. Consequently, when the level the load of the engine is reduced, the amount of secondary air fed into the exhaust system is reduced as compared with the case wherein the opening and the closing speed of the valve head is maintained at a constant speed, as in a conventional secondary air feed control valve. As a result of this, it is possible to feed an appropriate amount of secondary air into the exhaust system independent of the level of the load of the engine.

According to the present invention, since the vacuum level in the intake manifold has no influence on the amount of secondary air fed into the exhaust system, it is possible to prevent the total air-fuel ratio from becoming excessively large. As a result of this, since the fluctuation of the total air-fuel ratio can be minimized, the purifying efficiency of the three way catalyzer is improved and, thus, the harmful HC, CO and NOx components in the exhaust gas can be reduced independent of the operating condition of the engine.

While the invention has been described by reference to a specific embodiment chosen for purposes of illustration, it should be apparent that numerous modifications could be made thereto by those skilled in the art without departing from the spirit and scope of the invention.

What is claimed is:

1. A secondary air feed control device of an internal combustion engine having an intake passage and an exhaust passage equipped with a three way catalytic converter, said device comprising:
   means for detecting the total air-fuel ratio to provide a detecting signal indicating that the total air-fuel ratio is smaller than the stoichiometric air-fuel ratio;
   an air pump driven by the engine;
   a secondary air inlet opening into the exhaust passage located upstream of the three way catalytic converter; and
   valve means comprising a valve chamber connected to said air pump, a first valve port communicating said valve chamber with said secondary air inlet, a second valve port communicating said valve chamber with the atmosphere, an air valve co-operating with said first and said second valve ports, means actuating said air valve in response to said detecting signal for reducing the opening speed of said air valve when it opens said first valve port and for increasing the closing speed of said valve when it closes said first valve port in accordance with the reduction in the level of the load of the engine, said actuating means comprises a first actuating device and a second actuating device co-operative with said first actuating device, said first actuating device comprises a first vacuum operated diaphragm apparatus for actuating said air valve to close said first valve port, said second actuating device comprises a second vacuum operated diaphragm apparatus for actuating said air valve to open said first valve port, and said first vacuum operated diaphragm apparatus has a vacuum chamber normally connected to the intake passage via a switching valve which connects said vacuum chamber to the atmosphere via a restricted opening in response to said detecting signal when the total air-fuel ratio becomes smaller than the stoichiometric air-fuel ratio.

2. A secondary air feed control device of an internal combustion engine having an intake passage and an exhaust passage equipped with a three way catalytic converter, said device comprising:
   means for detecting the total air-fuel ratio to provide a detecting signal indicating that the total air-fuel ratio is smaller than the stoichiometric air-fuel ratio;
   an air pump driven by the engine;
   a secondary air inlet opening into the exhaust passage located upstream of the three way catalytic converter; and
   valve means comprising a valve chamber connected to said air pump, a first valve port communicating said valve chamber with said secondary air inlet, a second valve port communicating said valve chamber with the atmosphere, an air valve co-operating with said first and said second valve ports, means actuating said air valve in response to said detecting signal for reducing the opening speed of said air valve when it opens said first valve port and for increasing the closing speed of said valve when it closes said first valve port in accordance with the reduction in the level of the load of the engine, said actuating means comprises a first actuating device and a second actuating device co-operative with said first actuating device, said first actuating device comprises a first vacuum operated diaphragm apparatus for actuating said air valve to close said first valve port, said second actuating device comprises a second vacuum operated diaphragm apparatus for actuating said air valve to open said first valve port, and said second vacuum operated diaphragm apparatus has a vacuum chamber normally connected to the atmosphere via a restricted opening and via a switching valve which connects said vacuum chamber to a vacuum source of a constant level in response to said detecting signal when the total air-fuel ratio becomes smaller than the stoichiometric air-fuel ratio.

3. A secondary air feed control device as claimed in claim 2, wherein said vacuum source is an accumulator equipped with a pressure regulating valve and connected to the intake passage via a check valve.

4. A secondary air feed control device as claimed in claim 1, wherein said first and said second vacuum operated diaphragm apparatuses have a first and a second diaphragm, respectively, said air valve having a common valve stem which is connected to said first and second diaphragms.

5. A secondary air feed control device as claimed in claim 1, wherein said first and said second valve ports are arranged in tandum, said air valve being arranged between said first and said second valve ports so as to alternately close said first and said second valve ports.

6. A secondary air feed control device as claimed in claim 1, wherein said detecting means is an oxygen concentration detector.

7. A secondary air feed control device as claimed in claim 2, wherein said first and said second vacuum operated diaphragm apparatuses have a first and a second diaphragm, respectively, said air valve having a common valve stem which is connected to said first and second diaphragms.

8. A secondary air feed control device as claimed in claim 2, wherein said first and said second valve ports are arranged in tandum, said air valve being arranged between said first and said second valve ports so as to alternately close said first and said second valve ports.

9. A secondary air feed control device as claimed in claim 2, wherein said detecting means is an oxygen concentration detector.

* * * * *